Percival & Link,
Cage Trap.

No. 107,532. Patented Sep. 20, 1870.

Witnesses:
Andrew Craig
John Smith

Inventor:
Lionel V. Percival
Joseph Link

United States Patent Office.

LIONEL VERNON PERCIVAL AND JOSEPH LINK, OF UNITED STATES ARMY; SAID PERCIVAL ASSIGNS HIS RIGHT TO SAID LINK.

Letters Patent No. 107,532, dated September 20, 1870.

IMPROVEMENT IN ANIMAL-TRAPS.

The Schedule referred to in these Letters Patent and making part of the same

*To all whom it may concern:*

Be it known that we, LIONEL VERNON PERCIVAL, of company "F," and JOSEPH LINK, of company "B," Eighth Regiment of United States Infantry, at present stationed at the city and district of Charleston, in the State of South Carolina, did make new and useful Improvements in Animal-Traps; and we do hereby declare that the following is a clear and full description thereof, reference being had to the accompanying drawing and to the letters of reference marked thereon, in which—

Figure 1:
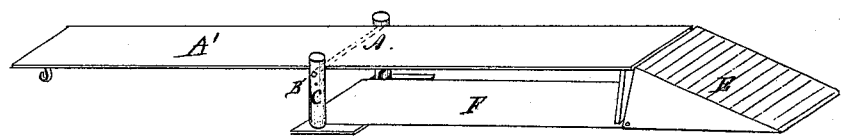
Figure 1:
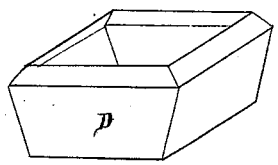
Figure 2:
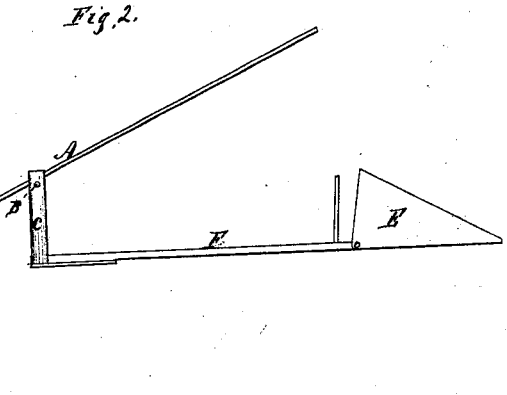
Figure 2:
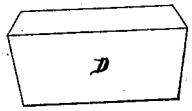

Figure 1 is a horizontal plank, A', one foot, more or less, in length, and one inch and one-half in width, and of the thickness of one-half inch, more or less. This plank is supported by an axle, A; this will work in communication with the plank. This axle is so constructed as just to merely balance, the rear end of the plank, however, being about half an ounce, more or less, heavier, (according to the size of the trap,) than the front end.

The axle is supported by insertion in sockets B, let into two perpendicular standards, C. By this method the animal will walk out upon the plank for the bait, which will be fastened on the under side of the end of the plank.

To deprive the animal of any hold in falling, the front end of the plank will immediately be borne down by the weight of the animal to a perpendicular position, and the animal will drop from the end of the plank into the receiver D, as shown.

When it has dropped into the receiver D, the plank will immediately return to its former position, thus resetting itself. Thus every animal that is caught will reset the trap for the next.

To the rear end of the plank we affix a support, on the under side, to keep the plank in a horizontal position when set, and at the distance of a quarter of an inch, more or less, we place a platform, which can be readily reached by the animal; this we mark E.

The receiver may be a basin, jar, bucket, or anything that will answer the purpose. By filling it with water, or leaving it empty, the animal may be caught dead or alive, as desired.

F represents the base or bottom of the trap.

Claim.

What we claim as our invention, and desire to secure by Letters Patent, is—

In an animal-trap, the combination of the plank A', axle A, sockets B, standards C, platform E, and base F, substantially as shown and described.

LIONEL V. PERCIVAL.
JOSEPH LINK.

Witnesses:
ANDREW CRAIG,
WILLIAM D. WALLACE.